United States Patent [19]

Deming

[11] 4,041,259

[45] Aug. 9, 1977

[54] SWITCH MECHANISM

[75] Inventor: Andrew F. Deming, Alliance, Ohio

[73] Assignee: The Alliance Manufacturing Company, Inc., Alliance, Ohio

[21] Appl. No.: 636,079

[22] Filed: Nov. 28, 1975

[51] Int. Cl.² .............................................. G06K 7/06
[52] U.S. Cl. ................................ 200/46; 235/61.11 C
[58] Field of Search ................... 200/46; 235/61.11 R, 235/61.11 C

[56] References Cited

U.S. PATENT DOCUMENTS

| 3,564,169 | 2/1971 | Sitz | 200/46 |
| 3,567,911 | 3/1971 | Grunberg | 235/61.11 C |

Primary Examiner—Herman T. Hohauser
Attorney, Agent, or Firm—Woodling, Krost, Granger & Rust

[57] ABSTRACT

A switch mechanism is disclosed which is readily adaptable to a multiple pole switch mechanism wherein a removable card is supported in a housing. First and second contacts make up a switch pair and are mounted in the housing for mutual cooperation with the first contact having a mounting portion, a movable contact portion and a movable actuable portion. The removable card provides a selective actuation means to actuate the first and second contacts between open and closed circuit conditions. The card has abutment means to engage the movable actuable portion of the contact blade or blades. Also, the card has alternative areas which do not actuate respective ones of the contacts and this may be provided by apertures in the card so that no material of the card is present to engage the contact blade actuable portion. Accordingly, either open or closed circuit conditions may be achieved. Where the switch mechanism is a multiple pole switch, the card may have apertures and abutments as desired to achieve a desired combination of open and closed circuit conditions. The foregoing abstract is merely a resume of one general application, is not a complete discussion of all principles of operation or application, and is not to be construed as a limitation on the scope of the claimed subject matter.

37 Claims, 11 Drawing Figures

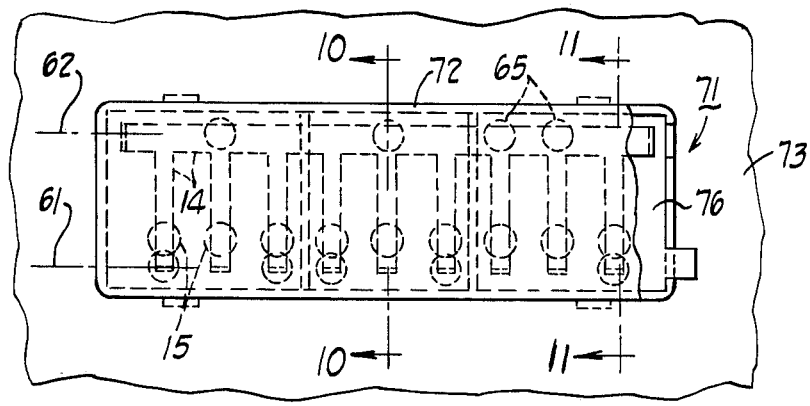
Fig. 8
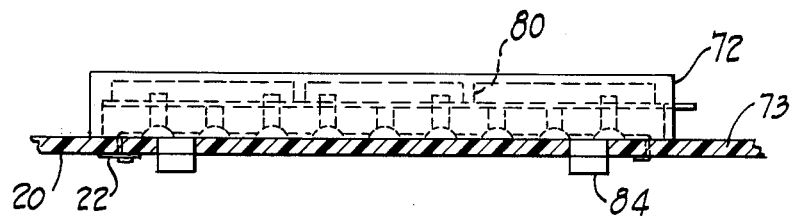
Fig. 9
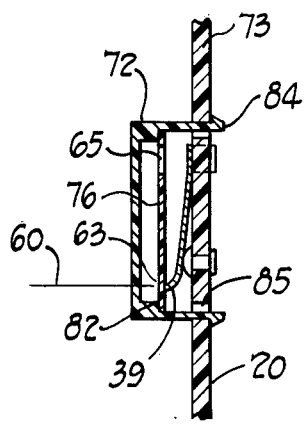 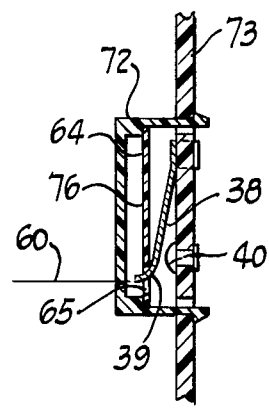
Fig. 10          Fig. 11

SWITCH MECHANISM

CROSS-REFERENCE TO RELATED APPLICATIONS

This invention is related to my application entitled Electrical Switching Device, Ser. No. 517,046 filed Oct. 23, 1974, now U.S. Pat. No. 3,959,756 issued May 25, 1976.

BACKGROUND OF THE INVENTION

The invention relates to electricity, circuit makers and breakers, mechanical and also multiple circuit control. The prior art has disclosed switches wherein an end of a cantilever blade can engage a stationary contact if an end of the blade drops into a notch in a movable actuator. Another prior art disclosure is a safety switch used with a microwave oven. If some material such as a dishcloth accidentally gets into the door of the oven, this cloth will have enough bulk to force a cantilever blade against a stationary contact. Such switches did not permit ready flexibility in selecting the actuation of a switch. They did not permit selective actuation of a group of multiple switches and they were not tamper resistant. They did not permit flexibility of contact actuation nor did they permit one, in a multiple switch, to be able to select a particular on and off pattern of the multiple switch yet be able to selectively actuate the switches in an exactly opposite condition. Accordingly, an object of the invention is to provide a switch mechanism which provides considerable flexibility in the actuation pattern of a multiple pole switch.

Another object of the invention is to provide a switch mechanism which is actuated by a card inserted into a support in a housing.

Another object of the invention is to provide a selective switch actuating means caused by abutments on a removable card.

Another object of the invention is to provide a switch actuating mechanism which responds, not to the apertures in a card, but to the abutments on a removable card.

SUMMARY OF THE INVENTION

The invention may be incorporated in a switch mechanism comprising in combination, a housing having a first reference plane, support means in said housing, a removable card supported on said support means and having abutment means, first and second contact means, said first contact means including a contact blade having a mounting portion, a movable contact portion and a movable actuable portion, first means relative mounting said second contact means and said housing in a position for engagement of said second contact means by said contact blade contact portion, and selective means to actuate said first and second contact means selectively into contact closed and contact open circuit conditions including said card and including first locator means establishing disposition of said card in said support means with said abutment means on said card in said first reference plane to engage said contact blade actuable portion to establish said first and second contact means in a first of said two circuit conditions.

BRIEF DESCRIPTION OF THE DRAWINGS

FIG. 8 is a plan view of the modification of the invention;

FIG. 9 is a front view of the switch of FIG. 6;

FIG. 10 is a sectional view on line 10—10 of FIG. 6; and,

FIG. 11 is a sectional view on line 11—11 of FIG. 6.

DESCRIPTION OF THE PREFERRED EMBODIMENT

Figure 1:
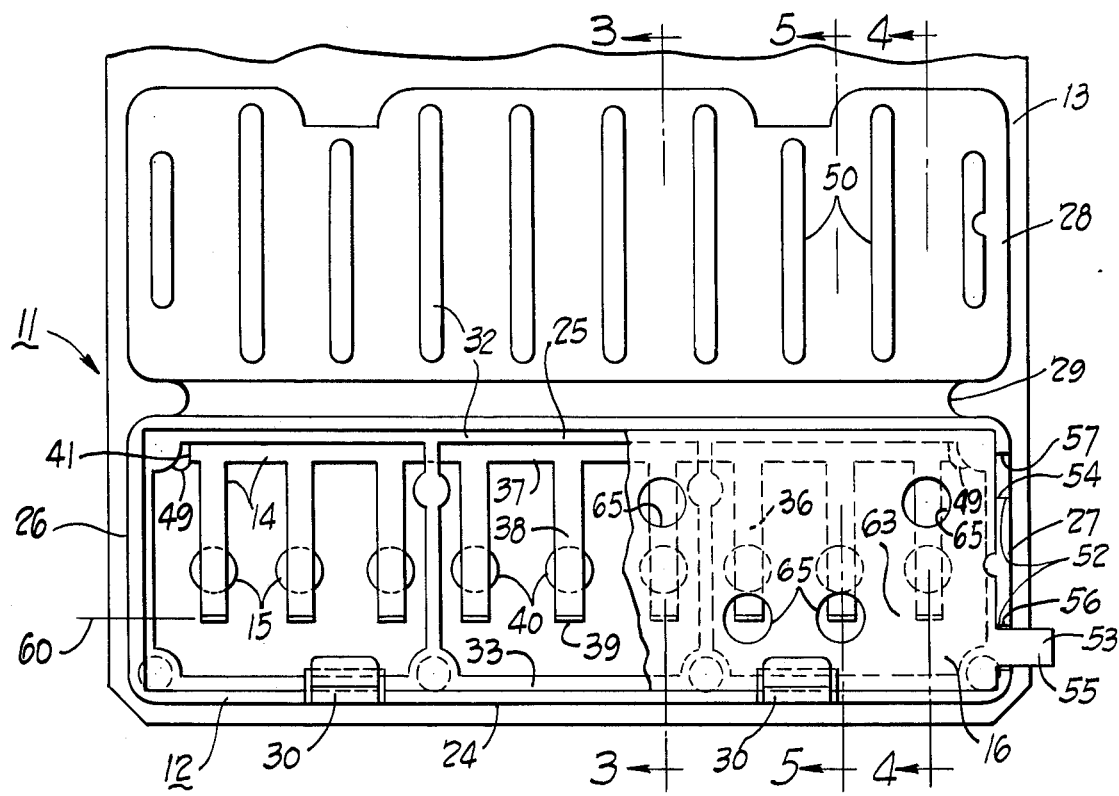
FIG. 1 is a plan view of a switch mechanism embodying the invention.

The FIGS. 1-7 show a switch mechanism 11 which incorporates the invention and includes generally a housing 12, a base 13, first contact 14, second contact means 15, and a card 16. The card 16 is shown partly broken away in FIG. 1. The base 13 in this preferred embodiment is of insulation material and may be what is known in the trade as a printed circuit board having a first side 19 and a second side 20. The second side 20 is one which has a conductor pattern 21 thereon including a conductor designated a common conductor 22. The first side 19 of the printed circuit board 13 is that on which the physical components are normally located and is the one on which the housing 12 is located.

Figure 5:
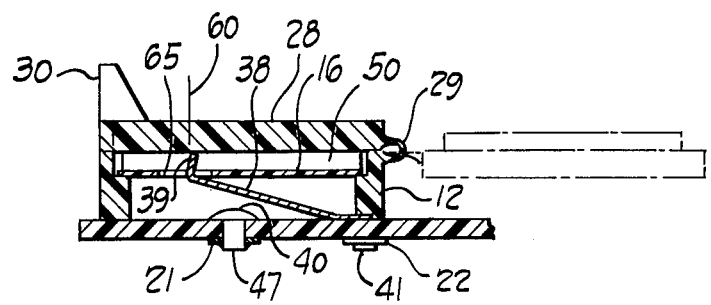
FIG. 5 is a sectional view on line 5—5 of FIG. 1 with the cover closed.
Figure 6:
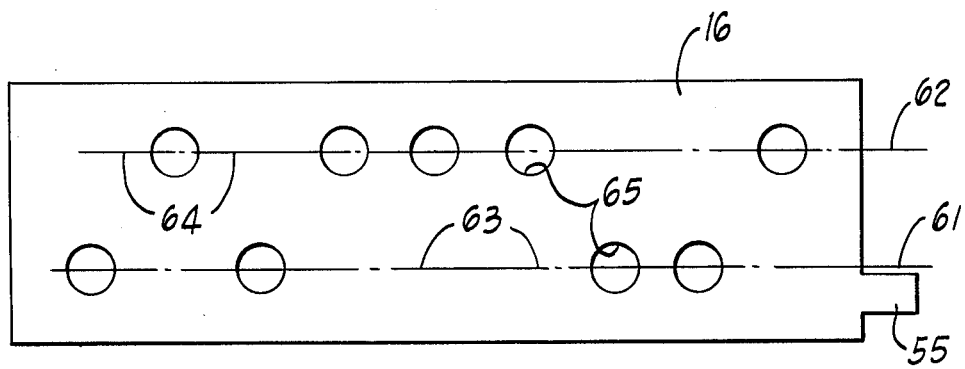
FIGS. 6 and 7 are plan and end views, respectively, of the card used within the switch mechanism.
Figure 7:

The housing 12 includes a front wall 24, a rear wall 25, and end walls 26 and 27 which defines an open top and open bottom housing. A cover 28 is a part of the housing 12 and is attached thereto by a unitary hinge 29. Unitary latches 30 are provided on the front wall 24 and may latch the cover in a closed position as shown in FIGS. 2 and 5. The latches may be moved outwardly against the resilience of the unitary connection with the front wall in order to release the cover 28. The housing 12 in this preferred embodiment is constructed of a semi-rigid molded plastic material and this housing and unitary cover may be molded in one piece in the open position shown in FIG. 1 and in phantom in FIG. 5.

Support means 32 is provided in the housing 12 for the card 16 and this support means includes in general the cover 28 and also includes a shoulder 33. This is a peripheral shoulder 33 on the inner side of the walls 24–27 and lie generally in a plane to receive the planar card 16.

In this preferred embodiment the switch mechanism is a multiple pole switch mechanism and the first contact means 14 is a comb-like structure having a rear strip 37 which is a mounting portion for such strip. This comb-like structure is a conductor, e.g., metal, and is resilient. The comb-like structure has a plurality of cantilever contact blades 36 extending from the rear mounting strip 37 and each contact blade 36 has a movable contact portion 38 and a movable actuable portion 39. The respective contact portions 38 are designed to be mounted in a position to engage respective ones of plural contacts 40 of the second contact means 15, a contact portion 38 and a movable actuable portion 39. The respective contact portions 38 are designed to be mounted in a position to engage respective ones of plural contacts 40 of the second contact means 15. A contact portion 38 and a contact 40 comprise a switch pair and in the preferred embodiment there are a plurality of such switch pairs in predetermined positions along the length of the housing 12. As shown in the drawings, there are nine such switch pairs in the embodiment shown.

First mounting means are provided to relatively mount the housing 12 and the first contact means 14. This first mounting means includes unitary studs 42 on the bottom of the housing 12 which extend through locking apertures 43 in the base 13. These studs 42 may be, for example, in the corners of the housing 12 and unitary heads 44 may be formed by heat deformation on the second side 20 of the base 13 to secure the housing 12 to such base 13. The rear strip 37 of the comb-like first contact means 14 is secured between the bottom edge 45 of the housing rear wall 25 and the base 13 to secure this first contact means 14 in position. Second mounting means is provided to mount the second contact means 15 in a position for engagement by the respective contact portions of the contact blades 36. The plurality of contacts 40 of the second contact means 15 in this preferred embodiment are heads of contact rivets 47 which extend through rivet apertures 48 in the base 13 and make electrical contact with the conductor pattern 21 on the second side 20 of the base 13. As stated above, a switch pair consists of a movable contact portion 38 of the first contact means 14 and a contact 40 of the second contact means 15. These switch pairs are in predetermined positions, namely 1–9, in the embodiment shown of a nine pole multiple switch mechanism.

The rear strip 37, which is the mounting portion of the first contact means has bendable tabs or extensions 41 extending through apertures 49 in the base 13 and at least one tab makes electrical connection with the common conductor 22. This may be by solder connection as is usual with printed circuit boards. Such common conductor may be a bus conductor providing a voltage for the various switch pairs or may be a ground conductor, as desired.

Figure 3:
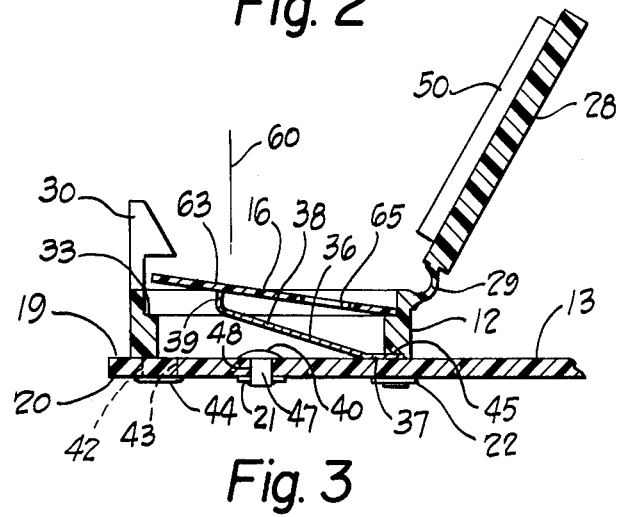
FIG. 3 is a sectional view on line 3—3 of FIG. 1, with the cover partly open.

The first contact means 14 is made of resilient material and each individual contact blade 36 has the movable contact portion 38 bent at about a 10° angle from the mounting portion 37 and has the movable actuable portion 39 bent at about an 80° angle from the contact portions 38, as shown in FIG. 3. The 10° bend establishes the contact portion 38 normally out of engagement with the respective contact 40 due to the resilience of the contact blade, as shown in FIG. 3. The 80° bend provides that the actuable portion 39 is transverse to the card 16 and in the preferred embodiment is generally perpendicular to this card.

Figure 4:
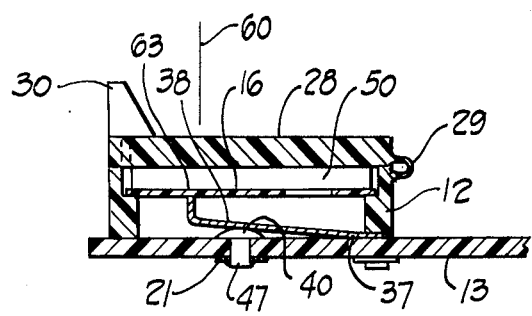
FIG. 4 is a sectional view on line 4—4 of FIG. 1 with the cover closed.

The support means 32 includes not only the shoulder 33 but includes the cover 28 and more specifically includes unitary elongated lugs 50 on the underside of the cover 28. These lugs 50 are disposed intermediate the predetermined positions of the switch pairs 38, 40 and together with the shoulder 33 support the card 16 not only against gravity but also against the resilient urging of the various contact blades 36. A comparison between FIGS. 3 and 4 will show that whereas when the cover 28 is open, the contact blades 36 may abut and hold the card 16 away from the shoulder 33, when the cover 28 is closed as shown in FIG. 4, then the card 16 is supported firmly in all directions despite the attitudinal direction of the switch mechanism 11 and despite gravity and urging of the various contact blades 36.

Selective means 52 is provided to actuate the first and second contact means selectively to open and closed circuit conditions. This selective means 52 includes the card 16 and includes first locator means 53 and second locator means 54. As stated above, the card 16 is supported in the housing 12 by the support means 32 but it is located by either the first or second locator means 53 or 54. The first locator means includes a tab on one of the cards 16 and housing 12 and a notch on the other. In the preferred embodiment the tab is shown as a tab 55 on the card 16 and the notch is a notch 56 in the end wall 27 of the housing 12. The second locator means 54 also includes a tab and a notch and in the preferred embodiment includes the tab 55 on the card 16 plus a second notch 57 in the end wall 27 of the housing 12 to alternatively receive the tab 55.

The housing 12 has a first reference plane 60 as shown in FIG. 5. The first mounting means mounts the actuable portions 39 of the first contact means in this first reference plane 60. The card 16 has first and second reference lines 61 and 62, respectively. Abutment means are provided on the card 16 and include a plurality of abutments 63 along reference line 61 and a plurality of abutments 64 along the reference line 62. In the preferred embodiment the abutments 63 and 64 are merely planar portions of the card 16 along each of the reference lines 61 and 62 at each of the nine predetermined positions of the switch pairs. In this preferred embodiment there is only one abutment for a switch pair and such abutment 63 or 64 will be in either the first reference line 61 or the second reference line 62, but not in both. Accordingly, the absence of an abutment in the other of the reference lines is provided by surfaces 65 which define apertures long the reference lines 61 and 62 at each of the nine predetermined positions. Accordingly, there is one abutment in one of the lines and one aperture in the other line for each of the switch pair positions.

The card 16 may be a metallic conductor but in the preferred embodiments of insulating material.

OPERATION

The card 16 is a part of the selective means 52 to selectively actuate a switch pair or a plurality of switch pairs into a selected open or closed circuit condition. The first locator means 53 includes the tab 55 on card 16 and notch 56 on the housing 12. This tab is generally along the first reference line 61 and permits placing the card 16 in the housing 12 so that the tab 55 is in notch 56 and, accordingly, the first reference line 61 will be along the first reference plane 60 of the housing 12. In this position the abutments 63 on the card 16 will be in the first reference plane 60. With the cover 28 open as shown in FIG. 3, the card may be placed on the shoulder 33 and the abutments 63 along the first reference line 61 will rest on the actuable portions 39 of the various contact blades 36. When the cover 28 is closed and latched (as shown in FIG. 4), the abutments 63 will press on the actuable portions 39 so that the respective contact portions 38 engage the respective contacts or rivet heads 40. Where there is an aperture 65 instead of an abutment 63 along the first reference line 61, then there is not material of the card 16 to engage the actuable portion 39 and accordingly the actuable portion 39 of that switch pair will extend at least partially into the aperture 65. This is as shown in FIG. 5 and it will be noted that in the preferred embodiment the actuable portion extends completely through such aperture 65.

Accordingly, the respective switch pair is in the open circuit condition.

In the preferred embodiment there is an abutment in one of the reference lines 61 and 62 and an aperture in the other of the reference lines 61 and 62 for each of the nine predetermined switch pair positions. The showing of nine switch pairs is only as an example of a multiple pole switch. This does, however, provide 29 combinations of switch positions, namely 512 different switch combinations merely by selecting the position of the apertures 65 along the card 16. Such a switch mechanism 11 may be used in a controllable radio circuit, for example, to provide 512 different codes of operation of the radio circuit. Should there be a malfunction, for example, in one of the nine different circuits controlled by the nine switch pairs, then the cover 28 may be opened and the card 16 turned over, side to side, so that the tab 55 would lie in the locator notch 57 rather than in the notch 56. This establishes the second reference line 62 on the first reference plane 60 and it means that the actual switch combinations are now exactly reversed. This is because wherever there was an abutment 63 there is now an aperture 65 along the first reference plane 60 and wherever there was an aperture 65 there is now an abutment 64. Accordingly, wherever there was a switch open condition, there is now a switch closed condition and vice-versa.

Considering only a single switch pair 38, 40, if an abutment 63 is present along the first reference plane 60, then the switch will be actuated into a closed circuit condition when the cover 28 is closed upon the card 16. If there is no abutment present along this first reference plane 60, namely, because there is an aperture 65 at that switch pair location, then the switch pair 38, 40 will be in an open circuit condition as shown in FIG. 5. Considering the switch mechanism 11 as an entirety, namely, including multiple poles, the disposition along the first reference plane 60 of the various abutments 63 and apertures 65, these will select either closed circuit or open circuit conditions, respectively, for the various switch pairs.

Figure 2:
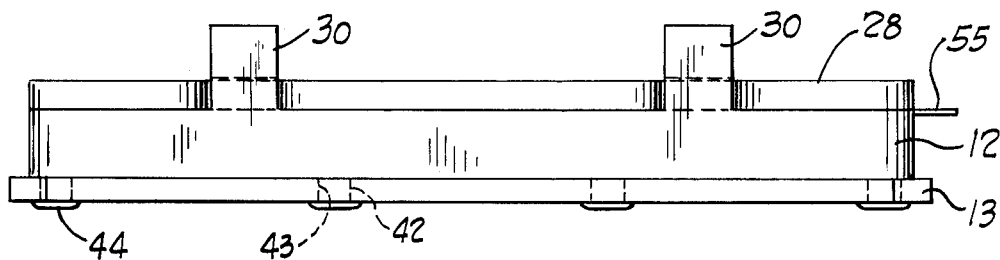
FIG. 2 is a front view of the switch mechanism of FIG. 1.

Considering the portion of the card 16 which is shown in the plan view of FIG. 1, for example, the first switch pair on the right will be actuated into the closed circuit condition because the abutment 63 on card 16 is in the first reference plane 60. The aperture 65 for that switch pair is out of position and does not cooperate with the actuable portion 39. The second switch pair from the right as viewed in FIG. 1 will be established in an open-circuit condition because the aperture 65 is in the first reference plane 60 for that switch pair position.

FIGS. 8-11 show a further embodiment of the invention including a switch mechanism 71 which includes generally a housing 72 and a base 73. Many parts of the switch mechanism 71 may be similar to the switch mechanism 11 of FIGS. 1-7, and the differences will be described hereinafter. Again, the base 73 may be a printed circuit board having a conductor on the second side thereof designated a common conductor 22. The switch mechanism 71 includes first contact means 14 and second contact means 15, the same as in the switch mechanism 11. The housing 72 may be an insulator housing, part of a housing assembly together with a card 76 similar to card 16 in that it has abutments 63 and alternative areas 65 along a first reference line 61. The alternative areas are established, as in the embodiment of FIGS. 1-7, by apertures so that there are no planar portions of the card acting as abutments. Also, the card 76 has abutments 64 and alternative areas 65 along the second reference line 62. Again, the card may be reversible side-for-side by the selective means established by tab and notch means similar to that in switch mechanism 11. The reversible feature means that only one aperture is provided in the card for each of the predetermined positions of the nine switch pairs of first and second contact means.

The card 76 may be an insulator card and is supported in support means 82 in the housing 72 which is generally a shoulder in a plane in the housing against which the card 76 may bear. The housing 72 also includes lugs 80 bearing against the card 76 for added stiffness. The housing 72 is shown as an open bottom housing and may be open top housing as well; but in this embodiment, it is shown as being closed top housing for added stiffness.

A tang 84 cooperates with a locking aperture 85 as securing means to secure the housing 72 to the base 73. In this embodiment there are a plurality of tangs which are unitary in this case with the housing 72 and there are a plurality of locking apertures 85 in the base 73. These tangs are slightly resilient and when the housing 72 is pushed down onto the base 73 with the tangs at the locking aperture locations, the tangs will push through such locking apertures and resiliently engage the second side 20 of the base 73. This secures the housing 72 and base 73 together.

FIG. 10 shows an abutment 63 at one of the predetermined positions of a switch pair cooperating with a movable actuable portion 39 of the first contact means 14 so that this switch pair is in a closed circuit condition.

FIG. 11 shows the actuable portion 39 cooperating with an alternative area or aperture 65 on the card 76 and therefore the contact portion 38 of the first contact means 14 is out of engagement with the respective contact 40 of the second contact means 15 for an open circuit condition of that switch pair. This is simlar to the switch operation of the switch mechanism 11.

The switch mechanism 71 has been shown as a nine-pole switch merely by way of example, and it may be a single pole or any multiple pole switch as desired. It will be noted as shown in FIG. 11 that if all of the apertures 65 are in the reference line 61 of the card 76, then these apertures 65 are in the reference plane 60 of the housing 72, and then the card 76 will be supported in only one direction, namely, that provided by a slight floating movement within the housing 72, but cannot escape. In this one of 512 switch conditions all switch pairs will be in an open circuit condition.

It will be noted that the switch mechanisms 11 and 71 provide switch mechanisms with considerable flexibility in arrangement of the open circuit and closed circuit conditions of the multiple poles of the switch. This flexibility is achieved very simply and in an economical manner by the simple expedient of the card 16 or 76. This card may economically be made of mylar tape of about 0.005 inches thickness and about one-half inch in width. The tape is provided on reels and may easily be punched in the desired aperture configuration. The card in combination with either the housing 12 or the housing 72 provides a housing assembly which is tamper-resistant to the changing of the switch condition. This would not be true if these were lever switches or slide switches wherein handles were available for manual actuation. In this case, the cover 28 must be separated from the housing 12 or the housing 72 must be separated from the base 73 in order to gain access to the card 16. This minimizes unauthorized changes of the switch condition; yet when the switch condition is desired to be altered, for example, the selective means is desired to be utilized to completely reverse the switch conditions, the housing may be opened and the card reversed side-for-side to place the tab 55 in the alternate notch 56 or 57. Also, the card 16 or 76 is completely removable to be replaceable by another card of a different aperture configuration. In each case it is the abutment means 63 or 64 which are located in the reference plane 60 of the housing which determines the actuated ones of the switch pairs.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A switch mechanism comprising, in combination,
a housing having a first reference plane,
support means in said housing,
a removable card supported on said support means transverse to said reference plane and having abutment means,
first and second contact means,
said first contact means including a contact blade having a mounting portion, a movable contact portion and a movable actuable portion,
first means relatively mounting said mounting portion and said housing with said actuable portion in said first reference plane and transverse to said card,
second means relatively mounting said second contact means and said housing in a position for engagement of said second contact means by said contact blade contact portion,
and selective means to actuate said first and second contact means selectively into one of contact closed and contact open circuit conditions including said card and including first locator means establishing disposition of said card in said support means with said abutment means on said card in said first reference plane to engage said contact blade actuable portion to establish said first and second contact means in a contact closed circuit condition.

2. A switch mechanism as claimed in claim 1, wherein said card is of insulating material.

3. A switch mechanism as claimed in claim 1, wherein said first contact means includes said contact portion being bent at a small angle in the order of ten degrees from said mounting portion,
and said actuable portion being at an end of said contact blade and bent at an angle in the order of eighty degrees from said contact portion to be capable of engaging said abutment means on said card.

4. A switch mechanism as claimed in claim 1, wherein said card has an aperture extending completely through the thickness of said member.

5. A switch mechanism as claimed in claim 4, wherein said aperture extends completely through the said card in said first reference plane.

6. A switch mechanism as claimed in claim 1, wherein said support means includes a support supporting said card against gravity and clamp means clamping said card against said support.

7. A switch mechanism as claimed in claim 6, wherein said support includes a shoulder in said housing and said clamp means includes a movable cover on said housing.

8. A switch mechanism as claimed in claim 7, wherein said shoulder is on a peripheral wall of said housing and said cover is attached to said housing by unitary hinges and latched to said housing by unitary latches.

9. A switch mechanism as claimed in claim 7, including unitary elongated lugs on the underside of said cover to engage said card with the cover in a closed condition to press said card firmly against said shoulder.

10. A switch mechanism as claimed in claim 1, including a base,
said first mounting means mounting said mounting portion of said contact blade between said housing and said base.

11. A switch mechanism as claimed in claim 10, including locking apertures in said base,
and unitary studs on said housing extending through said locking apertures to mount said housing to said base with said mounting portion therebetween.

12. A switch mechanism as claimed in claim 1, including a base, said first mounting means mounting said base and housing together and said second mounting means mounting said second contact means on said base.

13. A switch mechanism as claimed in claim 12, including first and second sides on said base,
said first mounting means mounting said housing on said first side of said base,
a conductor pattern on said second side of said base,
and said second contact means including contacts extending through apertures in said base from said first to said second side to be in electrical connection with said conductor pattern on said second side.

14. A switch mechanism as claimed in claim 1, including a first reference line on said card,
and said locator means permitting locating said first reference line in said first reference plane.

15. A switch mechanism as claimed in claim 14, including said abutment means on said card being on said first reference line.

16. A switch mechanism as claimed in claim 14, wherein said first locator means includes a tab on one of said card and said housing and includes a first notch to receive said tab on the other of said card and said housing.

17. A switch mechanism as claimed in claim 1, including second locator means establishing disposition of said card in said support means with the abutment means out of said first reference plane to establish said contact means in a second of said two circuit conditions.

18. A switch mechanism as claimed in claim 17, wherein said second locator means includes a second notch on the other of said card and said housing to receive said card in said housing in first and second alternative positions with said abutment means in and out, respectively, of said first reference plane.

19. A multiple pole switch mechanism comprising, in combination,
a housing having a first reference plane,
support means in said housing,
a removable card supported on said support means transverse to said reference plane and having abutment means,
first and second contact means,
said first contact means including a plurality of contact blades each having a mounting portion, a movable contact portion and a movable actuable portion, said second contact means including a plurality of contacts one each for respective ones of said contact portions, first means relatively mounting said mounting portions said said housing with said actuable portions in said first reference plane and transverse to said card, second means relatively mounting said second contact means and said housing in a position for engagement of each of said contacts of said second contact means by respective ones of said contact portions to establish a plurality of switch pairs, said first and second mounting means establishing said plurality of switch pairs in predetermined positions, a first reference line on said card, and means to selectively actuate each switch pair between open and closed circuit conditions including said card and including first locator means establishing disposition of said card in said support means with said first reference line in said first reference plane, said selective actuating means including at least one abutment of said abutment means on said card on said first reference line at one of said predetermined positions to have the respective contact blade actuable portion engage said one abutment to establish the respective switch pair in a first of said two circuit conditions and including lack of an abutment on said card on said first reference line at another of said predetermined positions to establish the respective switch pair in a second of said two circuit conditions.

20. A switch mechanism as set forth in claim 19, including a surface on said card defining an aperture to establish said lack of an abutment on said card on said first reference line.

21. A switch mechanism as set forth in claim 19, including a second reference line on said card,
at least one abutment of said abutment means lying in said second reference line, and second locator means establishing disposition of said card in said support means with said second reference line in said first reference plane to have the abutments in said first reference plane engage respective ones of said actuable portions of the switch pairs.

22. A switch mechanism as set forth in claim 19, including a base,
said second mounting means mounting each of said plurality of contacts of said second contact means on said base,
and said first mounting means mounting said housing to said base.

23. A switch mechanism as set forth in claim 22, including a conductor pattern on said base,
and means electrically connecting each of said contacts of said second contact means to said conductor pattern.

24. A switch mechanism as set forth in claim 19, wherein said first contact means includes a conductor comb having a rear strip as said mounting portion and having a plurality of resilient blades as said contact blades.

25. A switch mechanism as set forth in claim 24, wherein said contact blades are resilient conductor cantilever blades.

26. A switch mechanism as set forth in claim 19, including a base,
said first mounting means mounting said housing to said base with said mounting portion therebetween,
apertures in said base,
and extensions of said mounting portion passing through said apertures to the other side of said base.

27. A switch mechanism as set forth in claim 26, including a conductor pattern on said other side of said base,
a common conductor on said other side as part of said conductor pattern,
and means securing said mounting portion extensions electrically to said common conductor.

28. A switch mechanism as set forth in claim 19, wherein said abutment means is a solid portion of said card and said card including surfaces defining apertures in said card such that said actuable portions extend at least partially through said apertures in said first reference plane.

29. A switch mechanism as set forth in claim 21, wherein plural abutments of said abutment means lie in said first and second reference lines,
said abutments having positions corresponding to said predetermined positions,
and an abutment in one only of the two reference lines for each predetermined switch pair position to establish identically opposite switch actuating conditions upon turning said card in said housing to be located by said first and second locator means, respectively.

30. A programmable multi-pole switch mechanism including, a base,
a housing assembly including a housing and a card insertable therein in support means,
said card having abutment means thereon and at least one surface defining an alternative area for an absence of abutment means,
means to secure said housing assembly on said base,
first and second contact means,
said first contact means including a common conductor memeber and a plurality of individual contact portions,
said second contact means including a plurality of contacts one each for respective ones of said contact portions of said first contact means,
means mounting said first and second contact means relative to said housing assembly and base to establish said contact portions in predetermined positions and one each of said plurality of contacts of said second contact means respectively in said predetermined positions to establish a plurality of switch pairs,
said abutment means on said card including at least one abutment in one of said predetermined positions cooperating with a respective one of said switch pairs to establish a closed circuit condition thereof,
and said at least one alternative area of said card in another of said predetermined positions cooperating with a respective one of said switch pairs to establish an open circuit condition of the respective switch pair.

31. A switch mechanism as set forth in claim 30, wherein said housing is an insulated housing and said card is of insulation material.

32. A switch mechanism as set forth in claim 30, wherein said abutment means includes a plurality of abutments in said predetermined positions.

33. A switch mechanism as set forth in claim 30, wherein said securing means includes interlocking tang and aperture means on said base and housing assembly.

34. A switch mechanism as set forth in claim 30, wherein said securing means includes unitary tangs on one of said base and said housing assembly and locking apertures on the other of said base and said housing assembly to receive said tangs.

35. A switch mechanism as set forth in claim 30, wherein said first contact means includes a comb-like conductor member having a rear strip as said common conductor and having teeth-like blades as said contact portions.

36. A switch mechanism as set forth in claim 35, wherein each of said teeth-like blades is a cantilever blade having a contact portion and an actuable portion, said actuable portions being bent to be transverse to said card to cooperate with said abutment means thereon.

37. A switch mechanism as set forth in claim 30, wherein said card includes planar portions of the card as said abutment means and includes surfaces defining apertures as said alternative areas establishing the absence of abutment means.

* * * * *